(12) United States Patent
Knobloch et al.

(10) Patent No.: US 6,391,202 B1
(45) Date of Patent: May 21, 2002

(54) PROCESS AND APPARATUS FOR TREATING WASTEWATER FROM OIL PLANT PROCESSING AND CEREAL PROCESSING

(76) Inventors: Michael Knobloch, Zauckeroder Strasse 3, D-01159 Dresden; Andreas Schmidt, Roter Weg 2, D-09599 Freiberg; Reinhard Koch, Alte Kolonie 30, D-01609 Groeditz; Volkmar Peukert, Hohlbeinstrasse 48, D-01307 Dresden, all of (DE)

( * ) Notice: Subject to any disclaimer, the term of this patent is extended or adjusted under 35 U.S.C. 154(b) by 0 days.

(21) Appl. No.: 09/719,625
(22) PCT Filed: Jul. 2, 1999
(86) PCT No.: PCT/DE99/02037
 § 371 Date: Jan. 11, 2001
 § 102(e) Date: Jan. 11, 2001
(87) PCT Pub. No.: WO00/01622
 PCT Pub. Date: Jan. 13, 2000

(30) Foreign Application Priority Data

Jul. 3, 1998 (DE) ......................................... 198 29 673

(51) Int. Cl.⁷ ................................................ C02F 3/28
(52) U.S. Cl. ........................ 210/603; 210/608; 210/616; 210/617; 210/631; 210/151; 210/202; 210/218; 210/219
(58) Field of Search ................................ 210/603, 608, 210/612, 616, 617, 631, 150, 151, 202, 207, 208, 218, 219, 259

(56) References Cited

U.S. PATENT DOCUMENTS

| | | | | |
|---|---|---|---|---|
| 4,022,665 A | * | 5/1977 | Ghosh et al | 210/603 |
| 4,067,801 A | * | 1/1978 | Ishida et al. | 210/603 |
| 4,297,216 A | * | 10/1981 | Ishida et al. | 210/603 |
| 4,551,256 A | * | 11/1985 | Morper et al | 210/617 |
| 4,627,917 A | * | 12/1986 | Morper | 210/617 |
| 5,147,547 A | * | 9/1992 | Savall et al. | 210/150 |
| 5,227,051 A | * | 7/1993 | Oshima | 210/151 |
| 5,543,039 A | * | 8/1996 | Odegaard | 210/150 |
| 5,591,342 A | * | 1/1997 | Deporte et al. | 210/603 |
| 6,156,204 A | * | 12/2000 | Todd et al. | 210/617 |
| 6,217,759 B1 | * | 4/2001 | Kolesnikov et al. | 210/603 |

FOREIGN PATENT DOCUMENTS

| | | | |
|---|---|---|---|
| CH | 657604 | * | 9/1989 |
| EP | 474325 | * | 3/1992 |
| FR | 2620439 | * | 3/1989 |

* cited by examiner

Primary Examiner—Christopher Upton
(74) Attorney, Agent, or Firm—Jordan and Hamburg LLP

(57) ABSTRACT

The invention relates to a method and installation for treating waste water from oil seed and cereal processing, especially olive oil mill waste water (OMW), guaranteeing a substantial reduction of environmentally damaging waste water ingredients while taking economic factors into account. The aim of the invention is to develop a method and system designed to treat olive oil mill waste water, whereby higher physical, chemical, biochemical and biological elimination rates can be achieved using the material and energy potential of the OMW while taking economic aspects into account. The installation needs to be able to operate at short notice due to the amounts of seasonal waste. In the inventive method and installation thus disclosed, the fresh waste water is pre-treated by subjecting it to acidification with biogenic flocculation and separation of solid particles. The pre-treated waste water is then anaerobically and mesophilically processed using a carrier-bound biomass suspension, whereby fixing occurs using moving bed biofilm biology with cylindrical hollow bodies acting as a carrier material and the biogas thus arising, in addition to the sludge thus occurring, is removed.

12 Claims, 1 Drawing Sheet

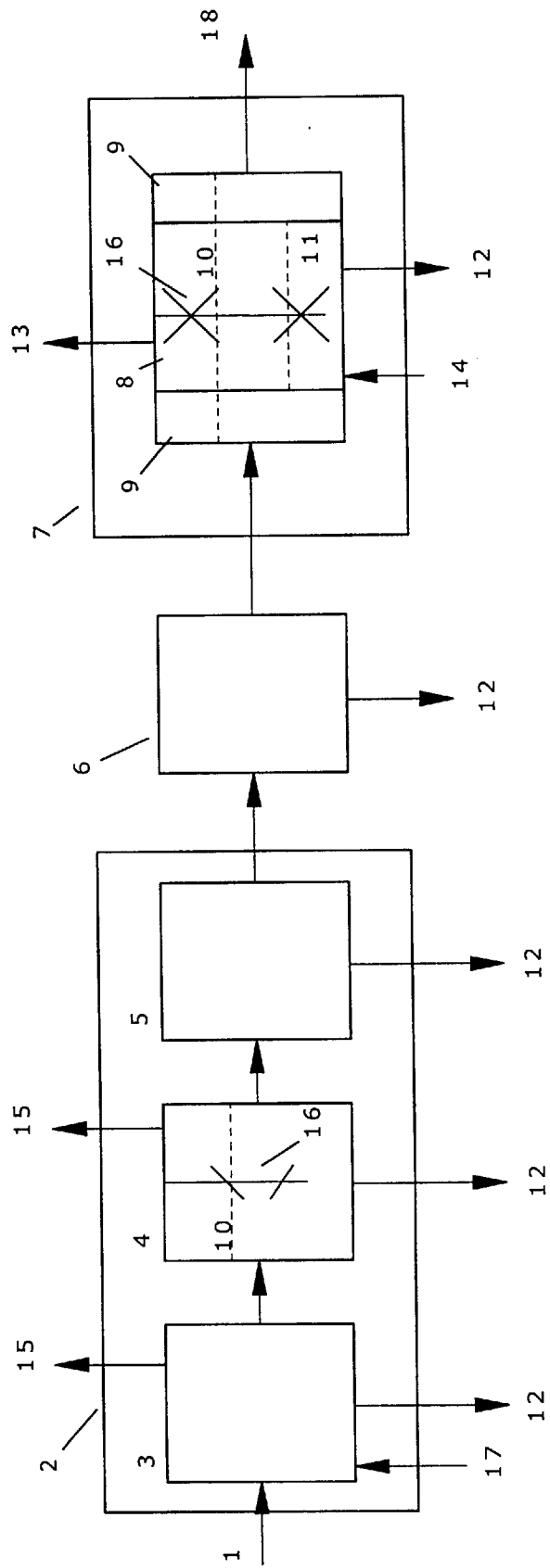

PROCESS AND APPARATUS FOR TREATING WASTEWATER FROM OIL PLANT PROCESSING AND CEREAL PROCESSING

BACKGROUND OF THE INVENTION

The invention relates to a process and an apparatus for treating wastewater from oil plant processing and cereal processing, in particular wastewater from olive oil production (OMW—olive oil mill wastewater), which ensures a substantial reduction in the environmentally polluting wastewater constituents, with economic factors being taken into account.

The wastewater from oil plant processing and cereal processing, for example from rape seed mills, sunflower seed mills or olive oil mills, is distinguished by a high organic loading. A particular feature of these wastewaters is their very high suspended matter content, due to the inclusion of comminution in the production process with subsequent pressing or centrifugation. Oil plant mill wastewater is produced seasonally during harvest time, in the case of OMW between November and March. The wastewater may contain toxic constituents which make a biological treatment more difficult.

Oil plant mill wastewater treatment is carried out predominantly in agricultural and/or lightly industrialized areas. As a result certain economic requirements arise.

The literature presents processing and equipment solutions for treating OMW which are based on physical, chemical, biochemical and biological methods or combinations thereof.

EP 0441103 A1 describes treatment of the OMW by aerobic oxidation, subsequent cooling and subsequent filtration through siliceous sand or activated carbon.

In EP 0295722 A1, the OMW is atomized in a tower in countercurrent to unsaturated air and the resultant concentrate is fed to a drier. However, the general changes in the technology of oil production, accompanied by relatively large amounts of wastewater and associated smaller dry matter contents of the OMW, decreases the economic efficiency of this process.

EP 0520239 A1 describes the addition of oxidizing agent to OMW, optionally in association with enzymes.

In WO 96/05145, 300 liters of natural bentonite are admixed per $m^3$ of OMW and a solid substrate is thus produced.

In WO 95/32158, organic waste is fed to an anaerobic treatment. Previously, the waste is mechanically processed and heat-treated. Sludge produced is taken off. The pretreated waste is fed to a funnel-shaped heated vessel. Resultant liquid waste is discharged from the vessel, admixed with water and fed back to the vessel. Resultant biogas is withdrawn. This single-stage anaerobic process relates to the treatment of solid organic wastes.

DE 19703018 A1 describes a process for the anaerobic fermentation of sewage sludge. A principal feature in this case is the physicochemical deflocking of the sludge before, during and after the individual anaerobic fermentation stages, with the aim of more effective fermentation. The process attempts to optimize the fermentation of sewage sludge by dissolution processes and not to reduce wastewater constituents by phase separation and solids removal.

WO 97/47561 describes a process for treating highly polluted and/or toxic wastewaters including those from oil production. In addition to the provision of a number of physical and chemical treatment stages, the biological treatment is performed in one or more aerobic, anoxic reactors with at least partial recirculation with feed of oxygen and addition of bacteria. This process is distinguished by a large number of process steps and by the addition of oxygen, which can be assessed as highly energy intensive and, depending on the application, as uneconomic.

A research report by AVENI(Water Res. Vol. 19 (1985), No. 5, pp. 667, 669]) relates to the anaerobic treatment of OMW as a single-stage process using a conventional sludge-blanket reactor.

EP 0711732 A2 describes a UASB (upflow anaerobic sludge blanket) reactor for the anaerobic purification of wastewater. A UASB reactor is furnished with modules which can carry out the separation of the three phases biosludge, biogas and water. Specifically, a description is given of technical improvements of the installations and the geometry of previous constructions which relate to other patents. The sludge blanket biology, in comparison with the biofilm biology, has disadvantages with respect to the process stability, seasonal mode of operation and short startup phases. In addition, there is no reduction in the organic loading and toxic substances, with the consequence of wastewater dilution or uneconomic reactor volumes.

A publication by Gharsallah(Influence of dilution and phase separation on the anaerobic digestion of olive mill wastewater—Bioprocess Engineering 10 (1994) pp. 29–34]) relates to the anaerobic treatment of OMW. In this case a prominent role is played by characterizing the effects of wastewater dilution and spatial separation of the anaerobic degradation processes into an acidification step and a methane stage. A dilution of the wastewater by fresh water is beneficial for the biological degradation processes, but leads to an increased wastewater production with a certain residual dirt load in the system effluent. In addition, providing an additional water input can prove problematic in practice in olive-oil-producing countries.

Studies on a bubble-column reactor for treating OMW are described by Hamdi and Ellouz in(Bubble column fermentation of olive mill wastewater by Aspergillus niger—J. Chem. Tech. Biotechnol. 1992, pp. 54, 331–335]. The reactor design serves for the growth of the mold culture Aspergillus niger, with the use of carrier bodies, which is said to promote fermentation of the wastewater by eliminating toxic constituents. The studies are directed toward the pretreatment of OMW by the use of a special mold culture and not towards reduction of pollutant load.

In Kampanos (Crete—Greece) there already exists an industrial-scale pilot installation for the anaerobic treatment of OMW. In the single-stage process using a conventional sludge-blanket reactor, the wastewaters are homogenized and neutralized in the pretreatment. This is followed by a reservoir from which the anaerobic stage is fed uniformly. The sludge sedimented in the reservoir is fed separately to a biogas installation.

The processes and installations described in the literature for purifying or eliminating wastewater from oil plant processing are suitable only to a limited extent for a cost-effective, process-stable and effective pollutant load reduction and significant decrease in the pollution of the environment with utilization of the material and energetic potential of the oil plants.

Oxidative treatment processes are less suitable for treating wastewaters of oil plant processing owing to the high energy requirement. In addition, the energetic potential thereof is not exploited.

Problems in the case of the anaerobic processes and installations described in the literature are considered to be that no effective pretreatment accompanied with a significant reduction in the organic loading and toxic substances is carried out prior to the methane phase. In addition, the known anaerobic processes are assessed as process-unstable and unsuitable for seasonal mode of operation. Sufficient process stability can only be achieved by very large uneconomic reactor volumes. In addition, the known processes have long startup times.

The object underlying the invention is to develop a process and an installation using which higher physical, chemical, biochemical and biological elimination rates are possible in the treatment of wastewater from oil plant processing and cereal processing with the utilization of its material and energetic potential, taking into account economic requirements. Short startup is to be possible, due to the seasonal production of wastewater.

SUMMARY OF THE INVENTION

1st stage: Acidification and Phase Separation

The fresh wastewater to be treated is firstly subjected to a pretreatment step.

The biochemical processes of hydrolysis and acidification proceeding in an acidification step cause a cleavage of organic compounds in which, by changing the electrochemical potential, biogenic flocculation of the suspended wastewater constituents is simultaneously initiated. The flocculation can be intensified by additional chemical and/or physical processes, for example by flocculating agents. The solids present in the wastewater to be treated can be separated off using flotation, sedimentation, filtration, centrifugation or electromagnetic separation processes.

The use of carrier bodies in the acidification reactor for colonization by sessile organisms promotes the biochemical cleavage and process stability. By means of the additional introduction of small amounts of air, the acidification processes may be influenced in favor of an anaerobic methanogenic further treatment. When carrier bodies are used in the acidification stage, an upstream flotation stage to separate off floatable constituents in the wastewater is necessary. Interruptions to operation may be avoided by this means. Here, optionally, by heating the flotation gas, additional effects, such as the outgassing of volatile constituents, can be initiated.

As a result of the complex biochemical and physical processes of the pretreatment, considerable reduction in loading of organic substances which are toxic for the methane biology takes place. Any further treatment can thus be performed more economically and in a more process-stable manner at a lower loading.

The separated sludge is further treated and can be utilized in the material form in the form of fertilizer, or energetically together with the solid residues of oil production.

2nd stage: Biogas Stage

The wastewater which has been pretreated and acidified in the first stage is further treated biologically under anaerobic environmental conditions in a single-stage or multistage biogas stage. In this, predominantly the dissolved and residual suspended substances are degraded. To even out wastewater variations and for a semicontinuous charging of the reactor, a buffer reservoir can be provided upstream. The biological processes in the reactor take place in the mesophilic temperature range. In this biogas step, treatment takes place by a suspended and support-immobilized biomass, the immobilization being by means of a moving-bed biofilm-biology. A moving-bed biofilmbiology is characterized by the use of small free-moving carrier bodies having a high specific surface area.

The use of a biofilm biology by sessile organisms minimizes unwanted discharge of active biomass and increases the process stability. In addition, this can achieve short startup times with a seasonal mode of operation of the installation. By means of the moving bed system, the carrier material can be positioned as required in the reactor without technical installations, i.e., special equipment design by selecting the material density. The free-moving bodies of the moving-bed system allow gas bubbles to pass through and can be mechanically mixed. The growth carrier material is in the form of cylindrical hollow bodies and advantageously has a theoretically colonizable surface of more than 800 $m^2/m^3$ of bulk volume. In the protected cavities of these carriers, there is increased colonization by the organisms. Biogas is removed and can be utilized energetically and makes possible very substantial energetically self-sufficient operation of the installation with an energy surplus.

Corresponding to the purification requirements and economic conditions, the treated wastewater can be used for irrigation, introduced into municipal sewage treatment plants or post-purified in a separate stage by aerobic processes or filtration.

BRIEF DESCRIPTION OF THE DRAWING

The drawing is a schematic flow diagram of an experimental installation according to the invention.

DETAILED DESCRIPTION OF A PREFERRED EMBODIMENT

The invention is explained in more detail below with reference to an example of an experimental installation having a daily water inflow of from 5 to 40 $m^3$ and a COD load of between 50,000 and 100,000 mg/l.

The wastewater arriving directly without buffer storage from the production of olive oil has a temperature of approximately 35° C. and is passed via a feed 1 into a concrete vessel 2 in which the pretreatment and acidification take place. The cylindrical vessel 2, having an internal diameter of 5 m and a height of 4 meters, is divided into three chambers, the subdivision into chambers being produced by a concentric dividing wall and two dividing walls in the cylinder ring of the vessel. All chambers are hydraulically connected and are to be considered as corresponding tubes. One cylinder ring forms the flotation reactor 3 in which, via an aeration device, flotation gas 17 is injected, as a result of which flotation processes are initiated. Scum which forms is skimmed off mechanically via a flotation skimmer 12. The inner chamber forms the acidification reactor 4. It has an internal diameter of approximately 3 m. The acidification reactor 4 comprises approximately 30% floating growth carrier material 10 which has a density around 0.9 $g/cm^3$ and a specific surface area of approximately 900 $m^2$ per $m^3$ of bulk volume. The growth carriers are 8 mm long cylindrical hollow bodies having a surface which is externally and internally grooved in the longitudinal direction, an external diameter of 5 mm and an internal diameter of 4 mm. The grooves are about 0.6 mm deep.

The activated sludge formation is assisted and stabilized by sessile cultures preferentially colonizing the carrier bodies. The contents of this reactor are mixed by means of a slowly rotating agitator 16. Via the stirring effect, the detachment of the sludge flakes from the growth carrier material is intensified. Sludge sediments and is taken off. The agitator 16 in the acidification reactor 4 simultaneously acts as a rake and transports the sedimentation sludge to the sludge takeoff channel at the vessel bottom. The third chamber forms the flocculation reactor 5 which acts as a settling tank. In the feed to the flocculation reactor 5, optionally, flocculating agent can be added. Sedimenting sludge is taken off via a sludge takeoff 12. Floating sludge is separated off by the revolving skimmer, which also serves the flotation reactor 3. The pH falls to approximately pH 3.5 to pH 5. Owing to the removal of sediment and floating sludge, the loading is reduced to approximately 40 to 60% of the initial values. The vessel is covered by a polyethylene film. The resultant gas phase is drawn off via a reactor gas takeoff 15, enriched with air and transported as combustion air to a biogas plant.

The sludge is passed into an approximately 100 m$^3$ capacity earthen basin compressed at the bottom. Via a coarse gravel filter, water which forms can run into the reservoir 6. At a sludge level of 80 cm, the overflow into the reservoir 6 starts.

The reservoir 6 is constructed as an approximately 300 m$^3$ capacity earthen basin compressed at the bottom. The maximum water level is 1.5 m. From the reservoir 6, a constant amount of approximately 7 m$^3$ is transported per day into the biogas reactor 7. The water is drawn off approximately 1.0 cm below the water surface. Via a floating apparatus, the draw off depth is kept constant in relation to the water surface as the water level changes.

The biogas reactor 7, like the preliminary purification means, is constructed as a cylindrical vessel having an internal diameter of 5 m and a height of 4 meters, but is only divided into two chambers, the subdivision into chambers being produced by a concentric dividing wall. The internal chamber 8 having a diameter of approximately 4 m has a capacity of approximately 50 m$^3$. The biogas reactor 7 is heated to approximately 36° C. via a wall heater and is thermally insulated externally. The COD space velocity is 2 to 6 kg/m$^3$* d. The wastewater is fed via a time-controlled pumping system from the reservoir 6 into the inner chamber 8 at the vessel bottom. The inner chamber 8 is filled to approximately 30% with floating growth carrier material 10 of a density around 0.9 g/cm$^3$ and to approximately 10% with sedimenting growth carrier material 11 of a density around 2.3 g/cm$^3$, which have a specific surface area of approximately 900 m$^2$ per m$^3$. The support bodies 10 and 11 ensure a biomass immobilization, in conjunction with an intensification and stabilization of the biological degradation processes. Via a slowly rotating agitator 16, the water and the carrier bodies are mixed. The outer chamber 9 acts as an anaerobic post-purification means with use of floating carrier bodies having a density of 0.9 g/cm$^3$. As a result of biological degradation processes, biogas forms which is taken off via a biogas takeoff 13 and is utilized energetically. The biogas reactor 7 is sealed in a gas-tight manner at the top by a 2 mm polyethylene film. The gas storage volume is approximately 15 m$^3$. Results of experiments.

In experiments on the two-stage anaerobic treatment of OMW with solids removal on a pilot-plant scale, a purification efficiency of 92 to 97% could be achieved, with a very largely odor-stable effluent.

Mean concentration values and parameters downstream of the individual treatment stages

| Parameter | Raw wastewater | Acidification | Flocculation | Methanation |
| --- | --- | --- | --- | --- |
| COD (g/l) | 70 | 40 | 26 | 3 |
| COD degradation rate (%) | 0 | 43 | 63 | 96 |
| DM content (g/l) | 71 | 39 | 15 | 2.8 |
| Phenol (g/l) | 3 | 0.6 | 0.5 | 0.08 |

-continued

| Parameter | Raw wastewater | Acidification | Flocculation | Methanation |
| --- | --- | --- | --- | --- |
| pH | 5.4 | 4.2 | 4.6 | 7.1 |
| HRT | — | 2.5 | — | 8 |

The sludge production, downstream of the solids separation, is approximately 0.2 to 0.25 m$^3$ per m$^3$ of wastewater at a DM content of approximately 36 g/l. The production of biogas having a methane content of 65 to 70% by volume by the methanation of OMW runs at 7 to 8 m$^3$ of gas per m$^3$ of wastewater and 350 to 400 l per kg of COD removed.

What is claimed is:

1. A process for treating wastewater from processing of plants for the extraction of oil therefrom or from processing cereal, comprising:
   first, acidifying the wastewater thereby to effect biogenic flocculation of solids;
   then, separating the solids from the wastewater;
   then, floating cylindrical hollow bodies having a high specific surface area in the wastewater to provide surfaces for colonization by organisms in the wastewater which produce biogas;
   and then removing the biogas from the wastewater.

2. A process according to claim 1, further comprising before the acidifying of the wastewater, removing solids then present in the water by flotation.

3. A process according to claim 2, further comprising in the flotation step introducing a heated gas into the wastewater to assist the flotation.

4. A process according to claim 1, further comprising assisting the flocculation by adding flocculants to the wastewater after the acidification.

5. A process according to claim 1, further comprising introducing small amounts of air into the wastewater during the acidification.

6. A process according to claim 1, further comprising immediately after the acidification feeding the wastewater to a reservoir in which fluctuations in feed volumes are buffered and sedimentation takes place and removing sedimented sludge thereby formed from the wastewater.

7. Apparatus for treating wastewater from processing of plants for the extraction of oil therefrom or from processing cereal, comprising:
   an acidification reactor provided with an agitator;
   means for feeding the wastewater into the acidification reactor;
   means for removing sludge from the acidification reactor;
   means for removing gas from the acidification reactor;
   a flocculation reactor;
   means for feeding wastewater from the acidification reactor to the flocculation reactor;
   means for removing sludge from the flocculation reactor;
   a biogas reactor in combination with means for heating the biogas reactor and means for circulating contents of the biogas reactor;
   cylindrical hollow bodies contained in the biogas reactor for physically supporting organisms contained in the wastewater, some of the cylindrical hollow bodies having a density of less than 0.95 g/cm$^3$ and the rest of the hollow bodies having a density of greater than 1.1 g/cm$^3$;

means for discharging biogas from the biogas reactor;
means for removing sludge from the biogas reactor; and
means for discharging treated wastewater from the biogas reactor.

8. An apparatus according to claim 7, further comprising a flotation reactor upstream of the acidification reactor and means for discharging sludge from the flotation reactor.

9. An apparatus according to claim 7, futher comprising hollow bodies contained in the acidification reactor for physically supporting organisms contained in the wastewater.

10. An apparatus according to claim 7, further comprising a reservoir downstream of the flocculation reactor and upstream of the biogas reactor.

11. An apparatus according to claim 7, wherein the hollow bodies have a surface theoretically colonizable by said organisms greater than 800 $m^2/m^3$ of their bulk density.

12. An apparatus according to claim 9, wherein the hollow bodies have a surface theoretically colonizable by said organisms greater than 800 $m^2/m^3$ of their bulk density.

* * * * *